(12) United States Patent
Hodgson

(10) Patent No.: US 6,354,157 B1
(45) Date of Patent: Mar. 12, 2002

(54) SYSTEM FOR MEASURING LOAD SUPPLIED TO A PLATFORM

(75) Inventor: Jeffrey W. Hodgson, Lenoir City, TN (US)

(73) Assignee: The University of Tennessee Research Corporation, Knoxville, TN (US)

( * ) Notice: Subject to any disclaimer, the term of this patent is extended or adjusted under 35 U.S.C. 154(b) by 0 days.

(21) Appl. No.: 09/615,553

(22) Filed: Jul. 13, 2000

(51) Int. Cl.[7] .................................................. G01L 5/00
(52) U.S. Cl. .................................................. 73/862.381
(58) Field of Search ...................... 73/862.041, 862.042, 73/862.044, 862.045, 862.046, 122, 129, 128

(56) References Cited

U.S. PATENT DOCUMENTS

| | | |
|---|---|---|
| 3,667,560 A | 6/1972 | Cooke |
| 3,805,604 A | 4/1974 | Ormond |
| 3,891,041 A | 6/1975 | Hall et al. |
| 3,967,691 A | 7/1976 | Wirth |
| 5,083,456 A | 1/1992 | Colarelli, III |
| 5,129,260 A | 7/1992 | van der Avoird |
| 5,230,242 A | 7/1993 | Colareli, III |
| 5,259,253 A * | 11/1993 | Wirth et al. .......... 763/862.638 |
| 5,305,636 A | 4/1994 | Balsarotti et al. |
| 5,359,902 A * | 11/1994 | Barger et al. .......... 73/862.626 |
| 5,979,230 A | 11/1999 | Balsarotti |
| 6,079,258 A | 6/2000 | List et al. |
| 6,105,438 A * | 8/2000 | Gieseke ................. 73/862.042 |

* cited by examiner

Primary Examiner—Benjamin R. Fuller
Assistant Examiner—Andre Allen
(74) Attorney, Agent, or Firm—Duane, Morris & Heckscher, LLP

(57) ABSTRACT

The present invention relates to a system for measuring loads applied to a platform, wherein the accuracy of the measurements is not adversely affected by any moments or torques resulting from the application of the load to the platform. The present invention is particularly suitable to platforms used to measure large loads and braking capability of trucks at weigh stations located along interstate highways.

18 Claims, 2 Drawing Sheets

SYSTEM FOR MEASURING LOAD SUPPLIED TO A PLATFORM

BACKGROUND OF THE INVENTION

This invention relates to a system for measuring loads applied to a platform. The present invention comprises a load platform, a bottom plate, vertical links extending between the load platform and the bottom plate, support brackets mounted to the bottom plate, horizontal links extending between support brackets and the load platform, and a force measuring device mounted in each vertical and horizontal link. The links are arranged such that each link is a two force member that cannot support moments. The present invention provides a means for summing the loads in the vertical links, transverse links, and longitudinal links in order to calculate the total load on the platform.

1. Field of the Invention

The present invention relates to a system for measuring loads and braking forces applied to a platform, wherein the accuracy of the measurements is not adversely affected by any moments or torques resulting from the application of the load to the platform. The present invention is particularly suitable to platforms used to measure large loads and braking capability of trucks at weigh stations located along interstate highways.

2. Description of the Prior Art

Scales have been used for centuries to measure weights or loads. Weight measurement is an essential element of many commercial transactions and industrial process.

Prior art load scales or weight measuring devices are described in U.S. Pat. No. 3,667,560 to Cooke, U.S. Pat. No. 3,805,604 to Ormond, U.S. Pat. No. 3,891,041 to Hall, et al., and U.S. Pat. No. 3,967,691 to Wirth. These prior art devices do not provide the capability to measure large loads or braking forces applied to a flat horizontally oriented platform subjected to moment forces or torques.

SUMMARY OF THE INVENTION

The present invention is directed toward a system for making load measurements. The term "load", as used herein, refers to a force. The invention comprises a load platform comprising a bottom surface, and at least three corner regions.

The invention further comprises a bottom plate positioned underneath and in substantial vertical alignment with the platform. The bottom plate comprises at least three corner regions in substantial vertical alignment with the four corner regions of the platform.

The invention further comprises at least two support brackets mounted on the bottom plate and extending upward without touching the platform. Each bracket has an upper region.

The invention further comprises at least 10 spherical rod ends or pivot mechanisms. Six of the spherical rod ends are attached to a corner region of the platform and a corner region of the bottom plate, such that each spherical rod end attached to a corner of the platform is in substantial vertical alignment with a spherical rod end attached to a corner region of the bottom plate. A spherical rod end is attached to each upper region of each support bracket. At least two more spherical rod ends are attached to the bottom surface of the platform, outside any corner regions of the platform.

The invention further comprises at least three vertically oriented links. Each of these links comprises a first end attached to one of the spherical rod ends attached to a corner region of the platform, and a second end attached to one of the spherical rod ends attached to the bottom plate.

The invention further comprises at least two horizontal links. Each of the horizontal links has a first end attached to a spherical rod end attached to the bottom surface of the platform, outside a corner region of the platform. Each of the horizontal links has a second end attached to a spherical rod end attached to an upper region of the bracket, such that the horizonal link extends between the bottom surface of the platform and the upper region of two of the mounting brackets in a substantially perpendicular arrangement to the vertical links.

The invention further comprises a force measuring device mounted in each vertical link and in each horizontal link.

DESCRIPTION OF THE PREFERRED EMBODIMENTS

Figure 1:
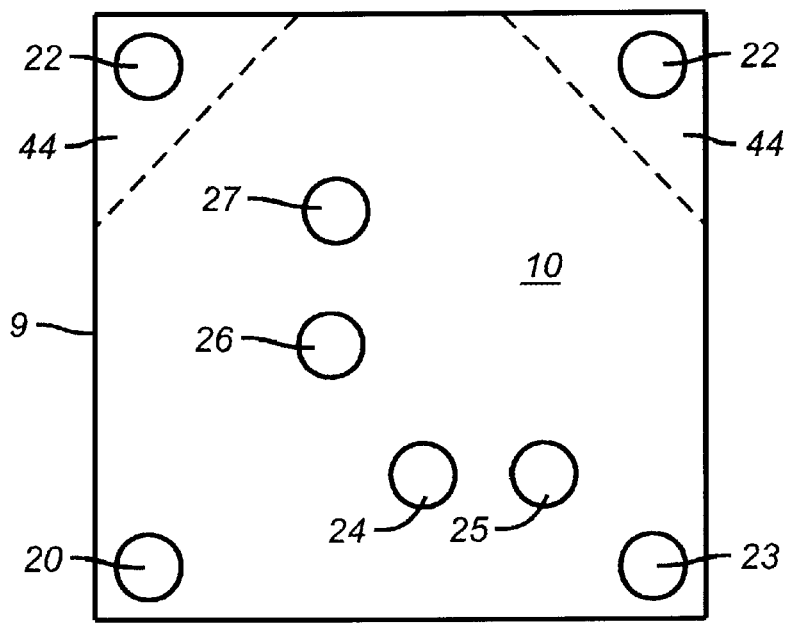
FIG. 1 is a bottom view of the bottom surface of a first preferred embodiment of the load platform from a point midway between the load platform and the bottom plate.

In a first preferred embodiment, the present invention is directed toward a system for making load measurements comprising a load platform 9 comprising a bottom surface 10, and four corner regions 44, as shown in FIG. 1. The shape of the load platform may be a number of different polygons. In one preferred embodiment, the load platform is square, as shown in FIG. 1. In another preferred embodiment, the load platform is triangular.

Figure 2:
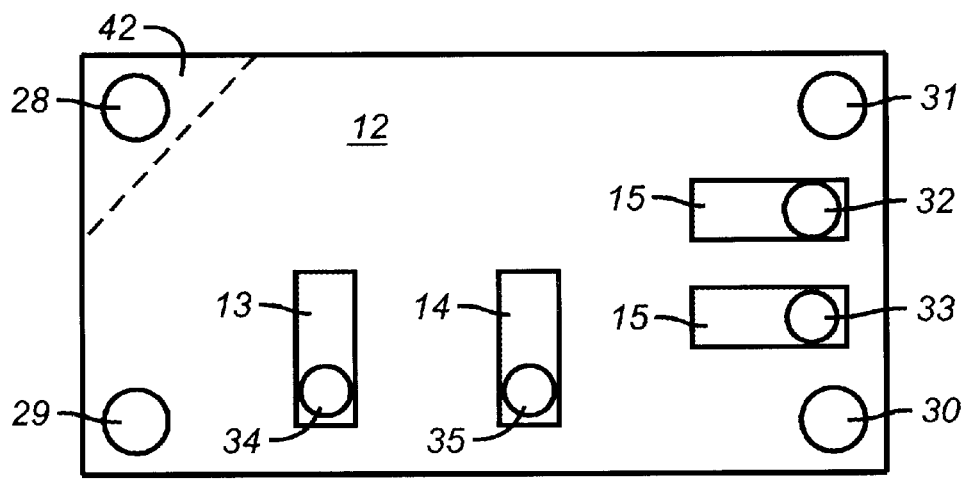
FIG. 2 is a top view of a second preferred embodiment of the bottom plate from a point midway between the bottom plate and the load platform.

The invention further comprises a bottom plate 12, positioned underneath and in substantial vertical alignment with the platform. In a first preferred embodiment, the bottom plate comprises four corner regions 42 in substantial vertical alignment with the four corner regions of the platform, as shown in FIG. 2. The shape of the bottom plate may be a polygon. In one preferred embodiment, the bottom plate is a rectangle, as shown in FIG. 2. In another preferred embodiment, the bottom plate is triangular.

In a first preferred embodiment, the invention further comprises four support brackets 13–16 mounted on the bottom plate and extending upward without touching the platform. Each bracket has an upper region. The first and second brackets 13–14 are positioned in substantially perpendicular relation to the third and fourth brackets 15–16, as shown in FIG. 2.

Figure 3:
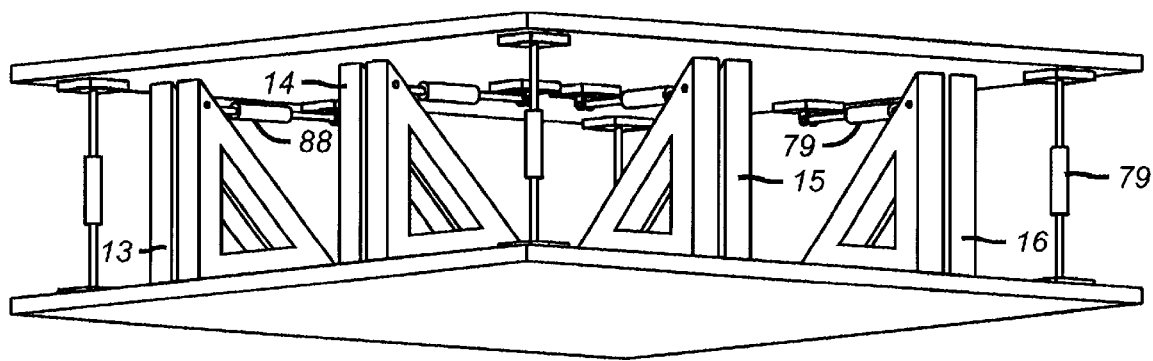
FIG. 3 is a side view of a third preferred embodiment of the present invention from a first side of the bottom plate.

In one preferred embodiment, the brackets are triangular, as shown in FIG. 3. In another preferred embodiment, the brackets are bolted to the bottom plate.

In a first preferred embodiment, the invention further comprises 16 spherical rod ends 20–35, as shown in FIGS. 1–2. In this embodiment, eight of the spherical rod ends are attached to a corner region of the platform and a corner region of the bottom plate, such that each spherical rod end attached to a corner of the platform is in substantial vertical alignment with a spherical rod end attached to a corner region of the bottom plate.

In a first preferred embodiment, four of the spherical rod ends 32–35 are attached to an upper region of a support bracket, as shown in FIG. 2. In this embodiment, four more spherical rod ends 28–31 are attached to the bottom surface of the platform, outside any corner regions of the platform.

The invention further comprises at least three vertically oriented links, as shown in FIG. 3. Each of these links comprises a first end attached to one of the spherical rod ends attached to a corner region of the platform, and a second end attached to one of the spherical rod ends attached to the bottom plate. In a first preferred embodiment, the inventor comprises four vertically oriented links.

The invention further comprises at least two horizontal, or substantially horizontal, links 88, as shown in FIG. 3. These links are hereinafter referred to as "horizontal links". Each of the horizontal links has a first end attached to a spherical rod end attached to the bottom surface of the platform, outside a corner region of the platform. Each of the horizontal links has a second end attached to a spherical rod end attached to an upper region of the bracket, such that the horizontal link extends between the bottom surface of the platform and the upper region of two of the mounting brackets in a substantially perpendicular arrangement to each other.

In this embodiment, the horizontal links are slightly diagonal because the first ends are slightly higher than the second ends. This height difference is attributable to the fact that the upper region of bracket does not extend all the way to the platform. In this case, the angle between the horizontal link and the platform, Z, is very small. Any force, load, or strain measurements taken in the horizontal link are multiplied by the cosine of angle Z to determine the force, load, or strain in the true horizontal dimension. Alternatively, the force may be calculated from the measured strain. The calculated force may then be multiplied by the cosine of angle Z to determine the force in the true horizontal dimension.

In another embodiment, one extension arm extends down from the platform for each spherical rod end attached to a first end of a horizontal link, such that the first and second ends of said links are located at the same height. In this embodiment, each horizontal link extends in a true horizontal plane. Accordingly any load measured in such a horizontal link represents the load in the horizontal dimension.

In one preferred embodiment, the two horizontal links are parallel to each other. In another preferred embodiment, the two horizontal links are perpendicular to each other, as shown in FIG. 3.

In a first preferred embodiment, the invention comprises a first and second horizontal link, parallel to each other, as described above. In this first preferred embodiment, the invention further comprises a third and fourth horizontal link, parallel to each other and perpendicular to the first and second horizontal links, as shown in FIG. 3.

Each of the third and fourth horizontal links has a first end attached to a spherical rod end attached to the bottom surface of the platform, outside a corner region of the platform. Each of the third and fourth horizontal links has a second end attached to a spherical rod end attached to an upper region of the bracket, such that the longitudinal link extends between the bottom surface of the platform and the upper region of two of the mounting brackets in a substantially parallel arrangement to each other.

Figure 4:
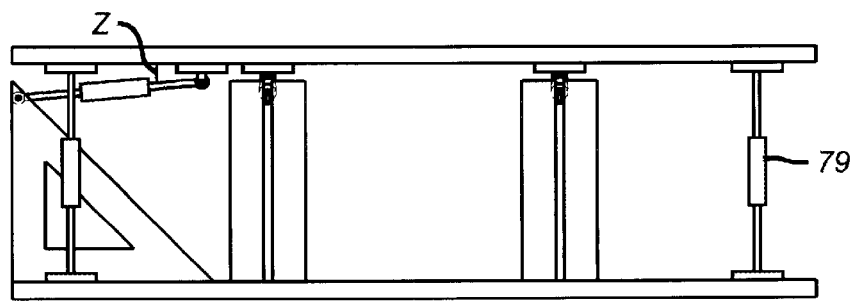
FIG. 4 is an isometric view of a fourth preferred embodiment of the present invention from a corner of the load platform and bottom plate.

The invention further comprises a force measuring device 79 mounted in each of the vertical and horizontal links, as shown in FIGS. 3–4. The term "force measuring device", as used herein, means any device capable of measuring a physical quantity from which force or load may be calculated or derived. In preferred embodiments, force measuring devices may be load cells or strain gauges.

The foregoing disclosure and description of the invention are illustrative and explanatory. Various changes in the size, shape, and materials, as well as in the details of the illustrative embodiments may be made without departing from the spirit of the invention.

What is claimed is:

1. A system for measuring loads applied to a platform comprising:
   a. a load platform comprising a bottom surface, and four corner regions;
   b. a bottom plate positioned underneath and in substantial vertical alignment with said platform, said bottom plate comprising four corner regions in substantial vertical alignment with the four corner regions of said platform;
   c. first, second, third, and fourth support brackets mounted on said bottom plate and extending upward without touching said platform, each of said brackets having an upper region extending in close proximity to the bottom surface of said platform, the first and second brackets being positioned in substantially perpendicular relation to the third and fourth brackets;
   d. sixteen spherical rod ends, eight of said spherical rod ends attached to said corner region of said platform and said corner region of said bottom plate such that each said spherical rod end attached to said corner region of said platform is in substantial vertical alignment with a spherical rod end attached to said corner region of said bottom plate, four of said spherical rod ends attached to an upper region each of said brackets, and four of said spherical rod ends attached to the bottom surface of said platform outside any corner regions of said platform;
   e. four vertically oriented links, each of said links comprising a first end attached to one of said spherical rod ends attached to said corner region of said platform, and further comprising a second end attached to one of said spherical rod ends attached to said bottom plate;
   f. two transverse links, each of said transverse links having a first end attached to a spherical rod end attached to the bottom surface of said platform outside said corner region of said platform and each of said transverse links further having a second end attached to a spherical rod end attached to an upper region of said bracket, such that said transverse links extend between the bottom surface of said platform and the upper regions of two of said mounting brackets in a substantially parallel arrangement to each other;
   g. two longitudinal links, each of said longitudinal links having a first end attached to a spherical rod end attached to the bottom surface of said platform outside said corner region of said platform and each of said longitudinal links further having a second end attached to a spherical rod end attached to an upper region of said bracket, such that said longitudinal links extend between the bottom surface of said platform and the upper regions of two of said brackets in a substantially parallel arrangement to each other and in a substantially perpendicular arrangement to said transverse links; and
   h. eight force measuring devices, one of said force measuring devices mounted in each of said four vertical links, each of said two transverse links, and each of said two longitudinal links.

2. The system of claim 1, wherein each force measuring device is a strain gauge.

3. The system of claim 1, wherein each force measuring device is a load cell.

4. The system of claim 1, wherein said brackets are triangular.

5. The system of claim 1, wherein said bottom plate has a first side region and a second side region perpendicular to said first side region.

6. The system of claim 5, wherein said first and second brackets are mounted to said first side region and wherein said third and fourth brackets are mounted to said second side region.

7. The system of claim 1, wherein said platform and said bottom plate are rectangular.

8. A system for measuring loads applied to a platform comprising:
   a. a load platform comprising a bottom surface, and three corner regions;
   b. a bottom plate positioned underneath and in substantial vertical alignment with said platform, said bottom plate comprising three corner regions in substantial vertical alignment with the three corner regions of said platform;
   c. first and second support brackets mounted on said bottom plate and extending upward without touching said platform, each of said brackets having an upper region extending in close proximity to the bottom surface of said platform;
   d. ten spherical rod ends, six of said spherical rod ends attached to said corner region of said platform and said corner region of said bottom plate such that each said spherical rod end attached to said corner region of said platform is in substantial vertical alignment with a spherical rod end attached to said corner region of said bottom plate, two of said spherical rod ends attached to an upper region each of said brackets, and two of said spherical rod ends attached to the bottom surface of said platform outside any corner regions of said platform;
   e. three vertically oriented links, each of said links comprising a first end attached to one of said spherical rod ends attached to said corner region of said platform, and further comprising a second end attached to one of said spherical rod ends attached to said bottom plate;
   f. two first and second horizontal links, each of said first and second horizontal links having a first end attached to a spherical rod end attached to the bottom surface of said platform outside said corner region of said platform and each of said first and second horizontal links further having a second end attached to a spherical rod end attached to an upper region of said bracket, such that said first and second horizontal links extend between the bottom surface of said platform and the upper regions of two of said mounting brackets in a substantially perpendicular arrangement to said vertical links; and
   g. five force measuring devices, one of said force measuring devices mounted in each of said vertical and horizontal links.

9. The system of claim 8, wherein each force measuring device is a strain gauge.

10. The system of claim 8, wherein each force measuring device is a load cell.

11. The system of claim 8, wherein said horizontal links are parallel to each other.

12. The system of claim 11, further comprising:
   a. a third support bracket mounted on said bottom plate and extending upward without touching said platform, said third bracket having an upper region extending in close proximity to the bottom surface of said platform;
   b. a spherical rod end attached to the upper region of said third bracket;
   c. a third spherical rod end attached to the bottom surface of the platform outside any corner region of the platform; and
   d. a third horizontal link extending between said third bracket and said third spherical rod end mounted on said bottom plate, such that said third horizontal link is perpendicular to said first and second horizontal links.

13. The system of claim 8, wherein said horizontal links are perpendicular to each other.

14. A system for measuring loads applied to a platform comprising:
   a. a load platform comprising a bottom surface, and four corner regions;
   b. a bottom plate positioned underneath and in substantial vertical alignment with said platform, said bottom plate comprising four corner regions in substantial vertical alignment with the four corner regions of said platform;
   c. first, second, third, and fourth triangular support brackets mounted on said bottom plate and extending upward without touching said platform, each of said brackets having an upper region extending in close proximity to the bottom surface of said platform, the first and second brackets being positioned in substantially perpendicular relation to the third and fourth brackets;
   d. sixteen spherical rod ends, eight of said spherical rod ends attached to said corner region of said platform and said corner region of said bottom plate such that each said spherical rod end attached to said corner region of said platform is in substantial vertical alignment with a spherical rod end attached to said corner region of said bottom plate, four of said spherical rod ends attached to an upper region each of said brackets, and four of said spherical rod ends attached to the bottom surface of said platform outside any corner regions of said platform;
   e. four vertically oriented links, each of said links comprising a first end attached to one of said spherical rod ends attached to said corner region of said platform, and further comprising a second end attached to one of said spherical rod ends attached to said bottom plate;
   f. first and second horizontal links, each of said horizontal links having a first end attached to a spherical rod end attached to the bottom surface of said platform outside said corner region of said platform and each of said horizontal links further having a second end attached to a spherical rod end attached to an upper region of said bracket, such that said horizontal links extend between the bottom surface of said platform and the upper regions of two of said mounting brackets in a substantially parallel arrangement to each other;
   g. third and fourth horizontal links, each of said third and fourth horizontal links having a first end attached to a spherical rod end attached to the bottom surface of said platform outside said corner region of said platform and each of said third and fourth horizontal links further having a second end attached to a spherical rod end attached to an upper region of said bracket, such that said third and fourth horizontal links extend between the bottom surface of said platform and the upper regions of two of said brackets in a substantially parallel arrangement to each other and in a substantially perpendicular arrangement to said first and second horizontal links; and h. eight force measuring devices, one of said force measuring devices mounted in each of said four vertical links, each of said two transverse links, and each of said two longitudinal links.

15. The system of claim 14, wherein said brackets are triangular.

16. The system of claim 14, wherein said platform and said bottom plate are rectangular.

17. The system of claim 14, wherein each force measuring device is a strain gauge.

18. The system of claim 14, wherein each force measuring device is a load cell.

* * * * *